United States Patent
Remillard et al.

Patent Number: 5,829,870
Date of Patent: Nov. 3, 1998

[54] VARIABLE HEADLAMP SYSTEM FOR AN AUTOMOTIVE VEHICLE USING AN ELECTROSTATIC SHUTTER

[75] Inventors: Jeffrey T. Remillard, Ypsilanti; Mahendra S. Dassanayake, Farmington Hills; Marie T. Malecki, Novi, all of Mich.

[73] Assignee: Ford Global Technologies, Inc., Dearborn, Mich.

[21] Appl. No.: 566,468

[22] Filed: Dec. 4, 1995

[51] Int. Cl.$^6$ ........................................ B60Q 1/04
[52] U.S. Cl. ................ 362/510; 362/278; 362/320; 362/321; 362/351; 359/230
[58] Field of Search ................ 362/61, 277, 278, 362/320, 321, 351; 359/230, 231, 320

[56] References Cited

U.S. PATENT DOCUMENTS

| | | |
|---|---|---|
| 3,553,364 | 1/1971 | Lee . |
| 3,746,911 | 7/1973 | Nathanson et al. . |
| 3,772,537 | 11/1973 | Clifford et al. . |
| 3,897,997 | 8/1975 | Kalt . |
| 3,989,357 | 11/1976 | Kalt . |
| 4,094,590 | 6/1978 | Kalt . |
| 4,105,294 | 8/1978 | Peek . |
| 4,208,103 | 6/1980 | Kalt et al. . |
| 4,229,075 | 10/1980 | Ueda et al. . |
| 4,234,245 | 11/1980 | Toda et al. . |
| 4,235,522 | 11/1980 | Simpson et al. . |
| 4,248,501 | 2/1981 | Simpson . |
| 4,323,952 | 4/1982 | Proske . |
| 4,336,536 | 6/1982 | Kalt et al. . |
| 4,403,248 | 9/1983 | Te Velde . |
| 4,420,896 | 12/1983 | Castleberry . |
| 4,468,663 | 8/1984 | Kalt . |
| 4,488,784 | 12/1984 | Kalt et al. . |
| 4,529,620 | 7/1985 | Glenn . |
| 4,695,837 | 9/1987 | Kalt . |
| 4,704,667 | 11/1987 | Ploeger . |
| 4,729,636 | 3/1988 | Te Velde et al. . |
| 4,741,599 | 5/1988 | Togo et al. . |
| 4,747,670 | 5/1988 | Devio et al. . |
| 4,794,370 | 12/1988 | Simpson et al. . |
| 4,805,038 | 2/1989 | Seligson . |
| 4,807,967 | 2/1989 | Veenvliet et al. . |
| 4,878,122 | 10/1989 | Glenn . |
| 4,879,602 | 11/1989 | Glenn . |
| 4,891,635 | 1/1990 | Hata . |
| 4,948,708 | 8/1990 | Veenvliet et al. . |
| 4,949,227 | 8/1990 | Finch et al. . |
| 4,956,619 | 9/1990 | Hornbeck . |
| 4,974,253 | 11/1990 | Nadir . |
| 4,985,816 | 1/1991 | Seko et al. . |
| 5,023,758 | 6/1991 | Allen et al. . |
| 5,161,875 | 11/1992 | Sikiguchi et al. . |
| 5,231,559 | 7/1993 | Kalt et al. . |
| 5,233,459 | 8/1993 | Bozler et al. . |
| 5,255,163 | 10/1993 | Neumann . |
| 5,264,993 | 11/1993 | Neumann et al. . |
| 5,347,433 | 9/1994 | Sedlmayr . |
| 5,353,133 | 10/1994 | Bernkopf . |

*Primary Examiner*—Thomas M. Sember
*Attorney, Agent, or Firm*—Steven A. Maynard

[57] ABSTRACT

A headlamp system for an automotive vehicle is provided having a light source generating light, a reflector, a generally transparent light shield, an electrostatic shutter and a lens. The light shield has a surface and laterally displaced edges. The reflector has a predetermined relationship with the light shield and the light source and directs a portion of light from the light source to the surface of the light shield. The electrostatic shutter means is adjacent the surface of the light shield to selectively blocking a portion of the light from the light source. A lens between the light shield and the image surface directs light passing the light shield.

1 Claim, 3 Drawing Sheets

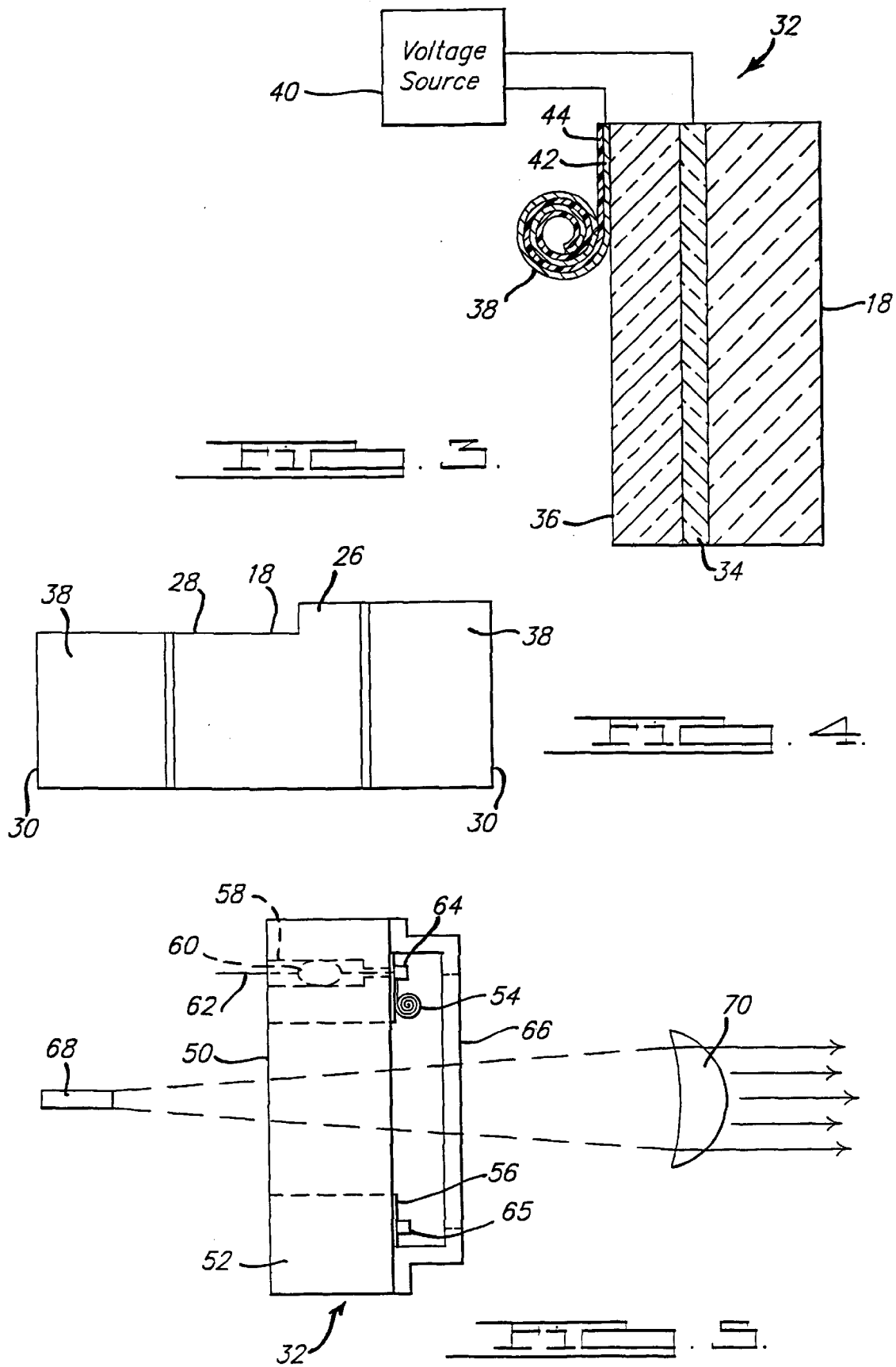

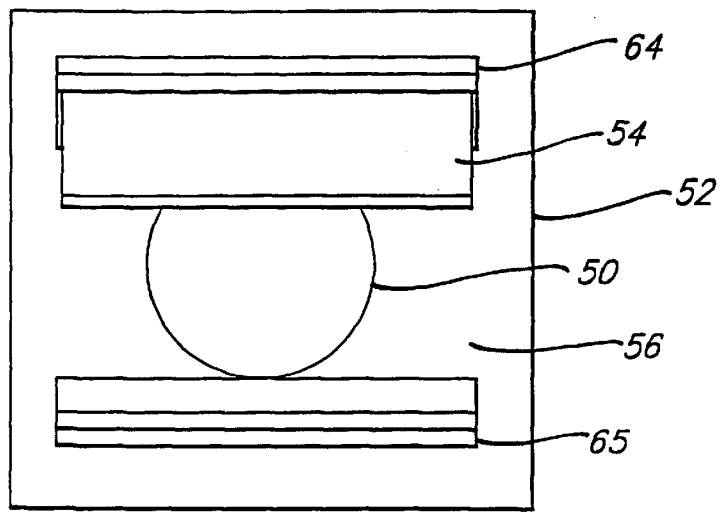
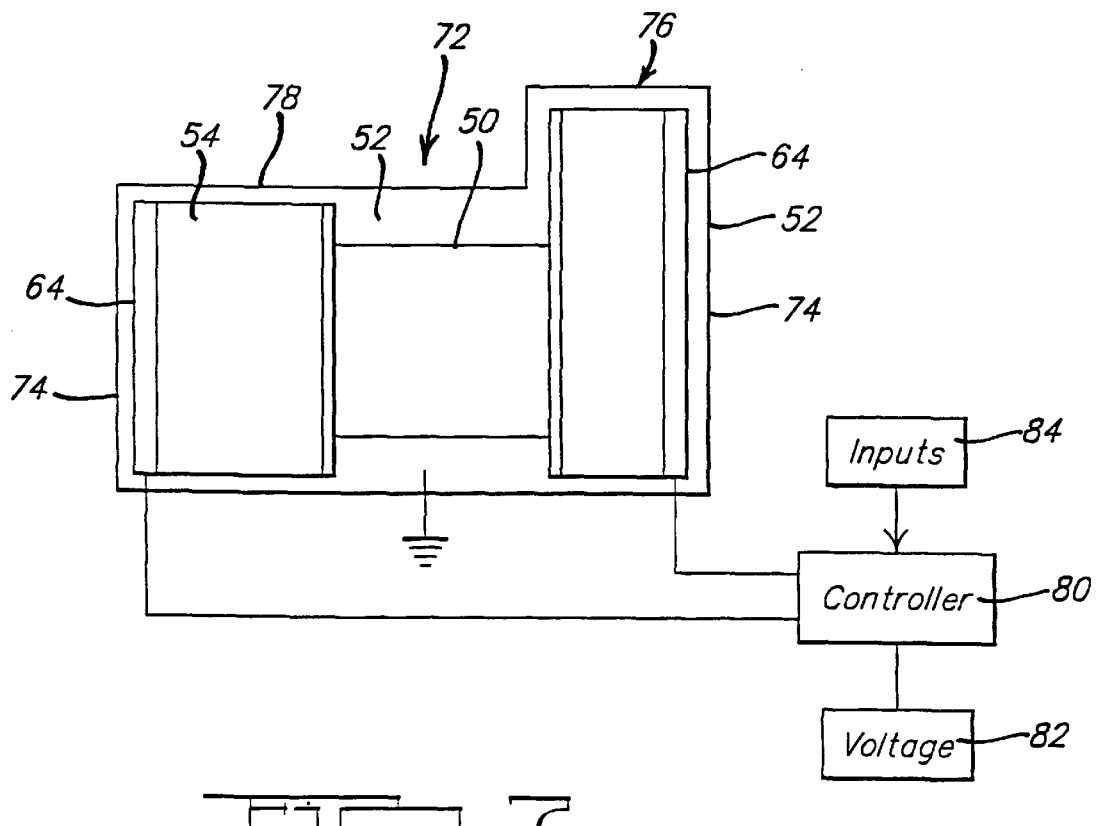
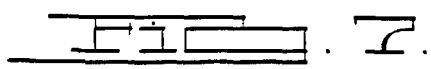

5,829,870

VARIABLE HEADLAMP SYSTEM FOR AN AUTOMOTIVE VEHICLE USING AN ELECTROSTATIC SHUTTER

RELATED APPLICATIONS

This application is related to commonly assigned patent application Ser. No. 08/566,520 filed concurrently herewith.

FIELD OF THE INVENTION

The present invention relates generally to a projector beam headlamp for an automotive vehicle and more specifically to a variable beam headlamp system for an automotive vehicle using an electrostatic shutter.

BACKGROUND OF THE INVENTION

Projector headlamps typically have a light source, a reflective surface, a light shield for blocking light that causes glare, and a lens. The reflector directs light to the center of the top edge of the light shield. After passing the light shield, the lens shapes the light to provide a proper beam pattern.

One disadvantage of prior art developments is that typically separate high beam and low beam lamps must be provided since the low beam lamp does not provide the output and direction for a high beam lamp. This configuration takes up considerable room in the front of the vehicle. Space in the front of the vehicle is valuable, so eliminating as many components as possible in the front of a vehicle is desirable.

U.S. Pat. No. 4,985,816 describes a projector beam headlamp using a light shield with a liquid crystal matrix divided into a plurality of controllable elements. Depending on the light output required, the elements are controlled to be either transparent or opaque. One problem with liquid crystal devices is that they typically do not operate over a wide range of temperatures nor do they have the switching speed as required in the operation of an automotive vehicle.

It would therefore be desirable to provide a device that would allow the use of a high beam and low beam lamp using a single light source and reflector that has rapid switching times, operates noiselessly, uses little power and performs over a wide range of temperatures.

SUMMARY OF THE INVENTION

The present invention overcomes the disadvantages of the related art by providing a light source generating light, a reflector, a generally transparent light shield, an electrostatic shutter and a lens. The light shield has a surface and laterally displaced edges. The reflector has a predetermined relationship with the light shield and the light source and directs a portion of light from the light source to the surface of the light shield. The electrostatic shutter means is adjacent the surface of the light shield to selectively block a portion of the light from the light source. A lens between the light shield and the image surface directs light passing the light shield.

An advantage of the present invention is that low beam and high beams use one light source and reflector while maintaining an energy efficient, quiet, reliable and non-temperature sensitive means for switching between the high and low beams.

BRIEF DESCRIPTION OF THE DRAWINGS

These and other objects, advantages, and features of the present invention will be apparent to those skilled in the lighting arts upon reading the following description with reference to the accompanying drawings, in which:

FIG. 3 is a cross-sectional view of the structure of an electrostatic shutter.

FIG. 4 is the front view of an aperture plate having two electrostatic shutters according to the present invention.

FIG. 5 is a cross-sectional of an alternative electrostatic shutter.

FIG. 6 is the front view of an alternative electrostatic shutter.

FIG. 7 is an alternative aperture plate constructed using an alternative electrostatic shutter.

DETAILED DESCRIPTION OF THE PREFERRED EMBODIMENT

Figure 1:
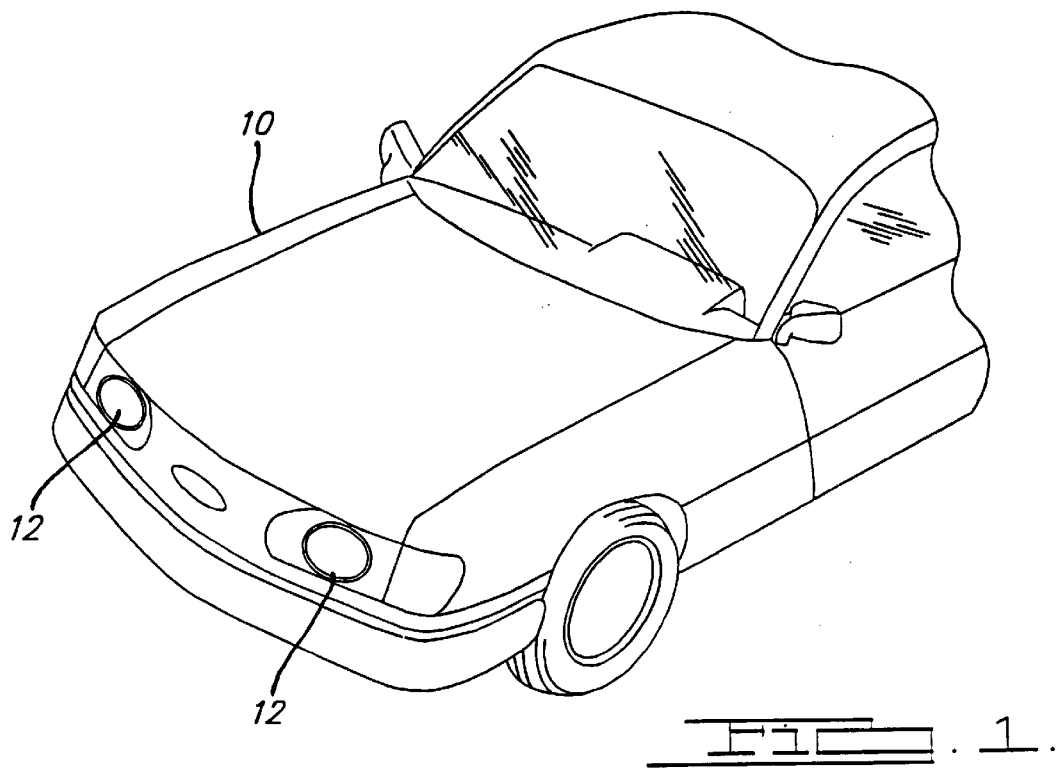
FIG. 1 is an automotive vehicle having a lighting system according to the present invention.

Referring to FIG. 1, an automobile 10 has a front lighting system comprised of lamps 12. Each of lamps 12 preferably provides both high beam and low beam operation.

Figure 2A:
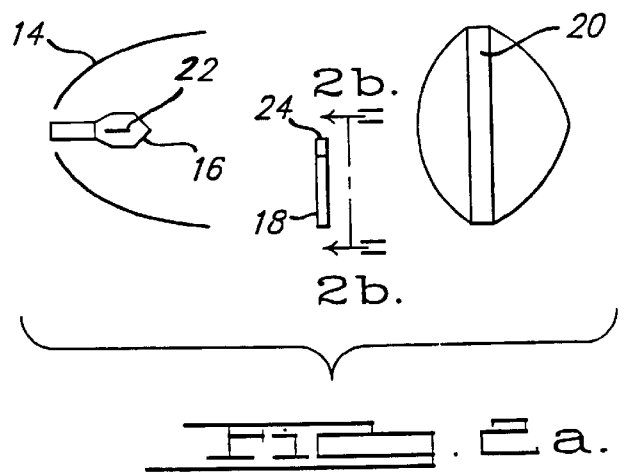
FIG. 2A is a cross-sectional view of a projector beam headlamp.

Referring now to FIG. 2A, a cross-sectional view of a projector headlamp is shown having a reflector 14, a light source 16, an aperture plate 18 and a lens 20. Reflector 14 has a generally ellipsoidal shape. The ellipsoid of reflector 14 has two focal points. The first focal point is located at a filament 22 of light source 16. The second focal point is located near top surface 24 of aperture plate 18.

Light source 16 may have a single filament 22. Light source 16 may also have a dual filament. One filament provides higher illumination for high beams.

Lens 20 is preferably an aspherical lens. Lens 20 has a focal length corresponding to the distance between the aspherical lens 20 and aperture plate 18.

Figure 2B:
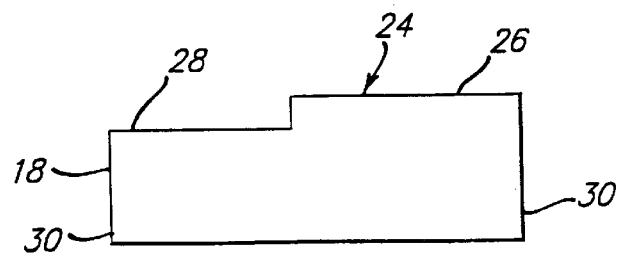
FIG. 2B is a front view of an aperture plate of FIG. 2A.

Referring now to FIG. 2B, the front view of aperture plate 18 is shown having a discontinuous top surface 24. Top surface 24 has a raised portion 26 and a lower portion 28. These portions are designed so that the light output of the headlamp will meet the required governmental regulations. Aperture plate 18 has laterally disposed edges 30. Aperture plate 18 is preferably formed of glass.

Referring now to FIG. 3, to maintain both high beam and low beam lamps in a single configuration, it is preferable to use an electrostatic shutter attached to aperture plate 18. In low beam operation aperture plate 18 has an electrostatic shutter 32 that blocks light from light source 16. In the high beam configuration, electrostatic shutter 32 is opened permitting substantially all the light from light source 16 to go through aperture plate 18 for maximum illumination.

Electrostatic shutter 32 is formed on aperture plate 18. One way in which electrostatic shutter 32 may be formed is by depositing a conductive coating 34 on the outer surface of aperture 18. Conductive coating 34 is transparent and may be made of any known transparent material such as indium tin oxide or any other suitable material. Conductive coating 34 is then insulated by a dielectric layer 36. Dielectric layer 36 is also formed of a transparent material such as plastic.

Over dielectric layer 36 a coiled scroll 38 is used to control the light entering aperture plate 18. Scroll 38 comprises a plastic layer 44 (a polymer like Mylar or Teflon) covered with an extremely thin layer of conductive material (e.g., an aluminum layer 42). Typically, aluminum layer 42 lies toward dielectric layer 36. Scroll 38 is unfurled when a potential difference exists between conductive coating 34 and aluminum layer 42. When an insufficient voltage potential is applied to aluminum layer 42, scroll 38 is rolled up.

Referring now to FIG. 4, aperture plate 18 is shown using two scrolls 38 extending from laterally disposed edges 30 toward the middle of aperture plate 18. This embodiment uses two scrolls, the first scroll when unrolled covers the raised portion 26 of aperture plate 18 and the second scroll is unrolled on lower portion 28 of aperture plate 18. The length of each scroll is such that when a sufficient voltage is applied to the scrolls aperture plate 18 is completely blocked. When high beam is required, no voltage would be applied to either scroll so aperture plate is not blocked.

Referring now to FIG. 5, an alternative construction of electrostatic shutter 32 is shown. Shutter 32 has an input window 50, an electrically and thermally conductive heat sink 52 and a scroll 54.

Input window 50 is made of a transparent material capable of conducting heat such as glass.

Scroll 54 is preferably formed of the same aluminum and plastic layer material as described above.

Heat sink 52 preferably also acts as a ground plane. A suitable material for heat sink is aluminum. An insulator 56 separates scroll 54 from conductive heat sink 52. Heat sink 52 is located on an edge of input window 50. Heat sink 52 preferably surrounds input window 50.

A power feed is provided to scroll 54 preferably by a channel 58 in heat sink 52 that is electrically insulated from heat sink 52 by insulator 60. A wire 62 connects to a contact 64 that is insulated from heat sink 52 by an insulator 56. Contact 64 connects wire 62 to the aluminum layer of scroll 54.

This configuration may also have a cover 66 to protect the scroll 54 from damage. Cover 66 is preferably transparent and encloses scroll 54.

This configuration may be used for forward lighting system in an automotive vehicle where scroll 54 controls the transmission of light. A light pipe 68 may be used to provide light through electrostatic shutter 32. A lens 70 may also be used to form the light into the desired pattern. In this configuration it is also not necessary that the electrostatic shutter be used in a projector beam head lamp. However, as described below it certainly may. In addition, a stop bar 65 may be provided to provide an end point for the unrolling of scroll 54. Stop bar 65 is preferably electrically insulated from the heat sink 52 or is formed of nonconductive material.

Referring now to FIG. 6, the front view of electrostatic shutter 32 of FIG. 5 is shown. Input window 50 may have a variety of shapes, including circular as shown.

One advantage of the electrostatic shutter of FIGS. 5 and 6 versus the electrostatic shutter shown in FIGS. 3 and 4 is that an insulator and a transparent conductor do not need to extend over input window 50. This results in the following benefits:

the reflection loses and glare due to the extra layers are eliminated;

opaque materials can be used for the insulating layer and the conductive layer that may result in significant cost savings and improved device performance; and the heating of these layers due to any optical absorption is also eliminated.

It is preferred that insulator 56 be of a type of material that is electrically insulative and thermally conductive when scroll 54 is unfurled. Scroll 54 is in intimate contact with heat sink 52 through insulator 56. Also, scroll is in direct contact with the input window 50. When scroll 54 is unfurled, it is in thermal contact with heat sink 52 through insulator 56 and directly through input window 50 that is in thermal contact with heat sink 52. To increase thermal coupling a coupling paste may be used between input window 50 and heat sink 52. Heat created by the absorption of light is drawn away from scroll 54 through heat sink 52. The reliability of this system is high in high temperature applications.

Referring now to FIG. 7, an aperture plate 72 similar to aperture plate 18 of FIG. 4 is shown. Electrical contact 64 preferably positioned along laterally disposed edges 74 of aperture plate 72. Preferably, two scrolls are provided, one for raised portion 76 and one for lower portion 78.

A controller 80 controls the connection of voltage source 82 to the electrical contact 64. Inputs 84 provide necessary information for controller 80 to determine whether to roll or unroll scroll 54.

In one configuration input 84 may be a conventional driver operated switch to determine whether high beam or low beam lamps should be illuminated. If high beam lamps are required, no voltage is provided to contact 64 of aperture plate. If low beams are required controller 80 connects voltage source 82 to electrical contact 64 to unroll scroll 54 to block the light coming through input window 50.

In another embodiment sensing elements such as a motion detector, a turn signal indicator, or near-by vehicle sensing can be used as input to controller 80 to be used in the determination as to whether to unroll either scroll 54 depending on which way the vehicle is turning. If, for example, the vehicle is turning to the right the right scroll will unroll either partially or fully to illuminate the right side of the road. If the vehicle is turning left, the left scroll is unrolled to illuminate the left side of the road.

In another embodiment of the invention, the aperture plate may be variably controlled by controller 80 to provide high beam, low beam and an infinite combination therebetween. Inputs for such a function may be a driver control dial or based on inputs such as a light detector for detecting light of an oncoming vehicle and a speed detector based on the speed of the vehicle. If the vehicle is sufficiently far away such as across the median of a highway perhaps an opening between open and closed may be used between scrolls. One such means for detecting vehicles is a radar based system to detect the distance between the vehicles.

As would be evident to one skilled in the art, several modifications of the invention may be made while still being within the scope of the appended claims. For example, the type of material used or the inputs and control strategy of the controller may be changed.

We claim:

1. A headlamp system for an automotive vehicle comprising:

a light source for generating light;

a reflector positioned to receive light from the light source and redirect the light in a predetermined direction;

a lens adapted to receive a portion of light traveling in the predetermined direction for projecting light externally of the vehicle;

a transparent light shield positioned intermediate the reflector and the lens having an imaging surface; and a plurality of electrostatic shutters disposed on the transparent light shield for selectively blocking a portion of the light traveling in the predetermined direction from traveling through the transparent light shield, each electrostatic shutter having:

a transparent electrically conductive layer adjacent the light shield;

a transparent dielectric layer adjacent the conductive layer; and a metallized polymer scroll having one end adapted to be electrically energized.

* * * * *